(12) United States Patent
Desai

(10) Patent No.: US 7,531,583 B2
(45) Date of Patent: May 12, 2009

(54) COMPOSITION USEFUL IN MANUFACTURING AUTOMOTIVE COMPONENTS

(75) Inventor: Sameer Desai, Lake Orion, MI (US)

(73) Assignee: Valeo, Inc., Auburn Hills, MI (US)

( * ) Notice: Subject to any disclaimer, the term of this patent is extended or adjusted under 35 U.S.C. 154(b) by 508 days.

(21) Appl. No.: 11/140,365

(22) Filed: May 28, 2005

(65) Prior Publication Data

US 2006/0270760 A1    Nov. 30, 2006

(51) Int. Cl.
*C08J 9/32* (2006.01)
(52) U.S. Cl. ...................... 523/218; 523/219
(58) Field of Classification Search ................. 523/218, 523/219
See application file for complete search history.

(56) References Cited

U.S. PATENT DOCUMENTS

| | | | |
|---|---|---|---|
| 4,767,726 A | 8/1988 | Marshall | |
| 5,849,229 A | 12/1998 | Holtzberg | |
| 6,103,156 A | 8/2000 | Holtzberg | |
| 6,334,160 B1 | 12/2001 | Emmert et al. | |
| 7,037,865 B1 * | 5/2006 | Kimberly | ............... 442/181 |

FOREIGN PATENT DOCUMENTS

| | | |
|---|---|---|
| JP | 2004189867 | 7/2004 |
| WO | WO00/35648 | 6/2000 |

* cited by examiner

*Primary Examiner*—Edward J Cain
(74) *Attorney, Agent, or Firm*—Dierker & Associates, P.C.

(57) ABSTRACT

The present invention relates to compositions useful in production of plastic or resin based parts or component applications, especially those applicable to the automotive industry.

In preferred embodiments of the present invention, a composition comprising at least one hollow or essentially hollow sphere or spheroidal shaped material, such as glass bubble, is found in a matrix comprised of a plastic or resin or plastic or resin like material, and is used in forming parts or components useful for automotive applications.

14 Claims, 4 Drawing Sheets

COMPOSITION USEFUL IN MANUFACTURING AUTOMOTIVE COMPONENTS

FIELD OF THE INVENTION

The present invention relates to compositions useful in production of plastic or resin based parts or component applications, especially those applicable to the automotive industry.

BACKGROUND OF THE INVENTION

Many automotive components, and, in particular, components useful for engine cooling purposes in motorized vehicles, are made out of plastic or plastic-like materials. Some of these components useful for engine cooling purposes include radiator end tanks, charge air cooler air tanks, radiator cooling fans, radiator shrouds and automotive front end structures carrying heat exchangers or other engine related parts. Many of these components are essentially comprised of plastics or plastic-like materials, and have, in the past, had certain fillers or other materials such as glass in the form of fibers or glass fibers with mica or talc or other mineral, so as to produce different combinations of properties and advantages in this so called 'modified' plastic.

As stated above, glass fiber filled materials alone can exist in multiple applications, and in automotive heat exchanger applications. Glass-mineral filled parts have also been described for use in vehicle shroud applications. Glass filled plastic materials have been used in front end carrier parts; combination glass fiber filling and metal hybrid parts are described as useful in front end carriers, as well as glass fiber filling only in some front end carriers.

Though multiple uses for products having certain glass and plastic compound components exists, it has also been found that in order to form these compound components for many automotive applications, specific additives to enhance needed properties, such as heat stabilizers to resist high temperatures or fluid stabilizers to resist against specific fluids or coupling agents to improve adhesion between glass or filler to plastic etc., have had to be used.

Glass fiber filling has often been used in other plastic and plastic like material applications to give a stronger part than that achievable in plastic and plastic like materials that have only talc or mica. Though they improve strength of the base material more than talc or mica or calcium carbonate etc., they also create non-uniform shrinkage and make part dimensions unstable. Whereas parts can be designed using smaller aspect ratio fillers (such as talc or mineral or combination of glass fibers and other fillers mixed in plastic compounds) for economic reasons, and are manufactured to provide improved dimensional stability of the part due to smaller aspect ratio fillers, this is not always desirable. More desirable is use of high modulus materials like glass in a lower aspect ratio when strength and improved dimensional stability is required. To reach this desired effect, solid glass beads have been proposed, and can be used, as filler to improve upon dimensional stability, while providing a stronger part than that achieved by combination of talc or minerals like fillers when mixed with glass fibers. However, these solutions to the strength and stability needs in a variety of automotive applications have the disadvantage of higher weight due to higher density of glass in parts comprising materials such as solid beads; and thus they are not as cost effective.

A number of processes to cast materials are found, for example in WO 0035648, Holtzberg, published Jun. 22, 2000; U.S. Pat. No. 6,344,160, Emmert et al., issued Dec. 21, 2001; U.S. Pat. No. 6,103,156, Holtzberg, issued Aug. 15, 2000; and U.S. Pat. No. 5,849,229, Holtzberg, issued Dec. 15, 1998. Descriptions exist of the use of glass fibers in a polymerized mixture to produce structural parts in which they are cast.

SUMMARY OF THE INVENTION

Preferred embodiments of the present invention include a composition used in making automotive components or parts comprising: a resin or resin like material or plastic or plastic like material forming a matrix; and at least one hollow spherical or sphere shaped material in the matrix, wherein the composition forms an end product comprising a solid component or part with sufficient strength and dimensional stability to be used in thermally varying environmental conditions.

In preferred embodiments of the present invention, a composition comprising a plastic or resin or plastic or resin like material and a spheroidal or sphere shaped material, especially a hollow material, is used. In more preferred embodiments of the present invention, in addition to the hollow material, filler material is present in the composition. In more preferred embodiments, at least one hollow or essentially hollow glass bubble is found in a matrix comprised of a plastic or resin or plastic or resin like material, more preferably a plurality of glass bubbles, and, particularly, hollow glass bubbles, are part of the composition. In preferred embodiments, the glass bubble is full of air or some other inert gas and with the matrix, form a composition useful for making parts and components for automotive applications. Such a composition is found particularly useful in thermally varying environmental conditions, for example, for front end and module applications in automotive vehicles and vehicle thermal systems, such as heating and/or air-conditioning system, and, in particular, engine cooling system application uses.

By using a glass bubble, and, in particular, a plurality of glass bubbles mixed into the plastic or resin or plastic or resin like material, a small aspect ratio bubble is employed, its use helping reduce the non-uniform shrinkage of the part and thus improving dimensional stability. The smaller aspect ratio bubbles are preferably present, and, more preferably, present with one or more other fillers in the matrix, and are used to provide improved dimensional stability. Preferred embodiments of the present invention employ at least one hollow glass bubble, and, preferably, a plurality of glass bubbles, to provide both good strength and dimensional stability compared to other smaller aspect ratio fillers. Also, in preferred embodiments of the present invention, the use of hollow glass bubble(s) reduces overall weight of the part, an important aspect or perceived need in automobile applications. In preferred embodiments, the glass bubble replaces plastic or other heavier weight materials such as other fillers or glass beads with lighter weight of glass component and air or other gasses. Hollow glass bubbles, and glass bubbles used with or in combinations with at least one other filler, such as glass fiber, in more preferred embodiments of the present invention, provide desired functional needs of the part along with the dimensional stability, which reduce development time of the part and provide long term dimensional stability and predictability, thus improving efficiency of manufacturing cycle of plastic parts for automobile components, and, more preferably, engine cooling or heat exchanger related automotive components.

The present invention, in its preferred embodiments, also provides for methods of providing automotive components, and, more preferably, heat exchanger and/or engine cooling automotive components, with advantages over components made up of prior art materials. Glass fibers make for heavier polymerizable mixtures and when casting processes are used, the normal processes require methods to keep fibers suspended. In addition, during the pouring of the mixture, glass fibers alone or in combination with many other fillers have a tendency to settle downward if the systems are not designed properly. By employing a plurality of hollow glass bubbles which are, consequently, lighter than the polymerizable mixture or with density of glass bubble which can be adjusted through the glass thickness forming the bubble to help improved suspendability, suspension of bubble is much easier than suspension of fillers such as glass fibers, and hence the use of hollow glass bubble comprising compositions, in conjunction with casting processes, produces plastic or resin based components in an advantageous manner and results in to lighter and dimensionally accurate final products or assemblies in preferred embodiments of the present invention.

In one of the aspects of the present invention, therefore, there is provided a composition that has more, if not all, of the advantages of previously known plastic compound materials, without the need for additional additives or enhancers to improve its properties for use in automotive applications. In preferred aspects of the present invention, there is provided a solution to the problem inherent in glass fiber filled only plastic or plastic materials of a need to reduce weight and providing for structural stability and easier manufacture, while retaining the strength and other properties necessary in modern automotive applications. By providing for a specific composition comprising plastic and/or resin or plastic and/or resin like materials, hollow glass bubbles, glass fibers and other current secondary fillers aspects of the present invention allow the fabrication of parts and superior or optimized characteristics of both strength and cost, without the disadvantages of dimensional instability or non-uniform shrinkage of the part.

By providing for optimum or superior structural properties along with dimensional stability, certain aspects of the present invention provide for a composition or compositions especially suited for use in automotive applications, more preferably for use in automotive engine cooling applications, even more preferably for use in heat exchanger, fan shroud, and other automotive applications. The present invention, in its preferred embodiments or aspects, can be used with plastic or resin, or plastic or resin like materials, including but not limited to generic and specific thermoplastics, thermosets and polymerizable materials, including fluids, as base material or matrix material.

As stated above, preferred aspects of the present invention, therefore, provide for a composition or compositions, especially useful in automotive applications, and, even more preferably useful in automotive engine cooling applications. The compositions useful in automotive engine cooling applications are preferably used in the components or parts used to provide the engine cooling system. By engine cooling system it is meant where automotive components such as heat exchangers, housings, front end carriers and fan systems that are provided to thermally manage the temperatures of various fluids in the vehicles specifically oils, air and radiator coolants.

In preferred embodiments of the present invention, compositions comprising hollow spherical shaped materials useful for use in engine cooling components such as radiators tanks, shrouds, fans, front end carriers, charge air cooler tanks, heat core tanks, HVAC housing, brackets, blosters, air deflecting doors in HVAC housing, etc., and the like, are provided with improved dimensional stability with optimum strength improving quality, cost and weight and thus improving manufacturing efficiencies.

Some preferred aspects of the present invention provide for a composition comprising others fillers such as glass fibers, graphite, carbon, ceramic, minerals, talc, in addition to hollow spherical shaped materials, such as hollow glass bubbles, in the composition. Such a composition allows use of plastic or plastic like or resin based materials with strength and stiffness characteristics, as well as dimensional characteristics, that are necessary in the automotive, and particularly, thermally varying environmental conditions, such as, preferably, automotive engine cooling environment. In preferred aspects of the present invention, for example, one or more thermoplastic compounds, preferably used in injection molding, are present, for example Nylon 66 (PA66), Nylon 6 (PA6), Nylon 66/612 (PA66/PA612), PA6T, PA9, high temperature aromatic or semi aromatic nylons or polyphthalamide (PPA), nylon 46, polyphenylene sulfide (PPS), polypropylene (PP), polyether imide (PEI), polyether sulfone (PES), liquid cristalline polymer (LCP), polyaryl ether ketone (PEEK) or blends of materials. In other preferred aspects of the present invention, wherein is found thermoset type compositions, thermoset resins that can be used include, but are not limited to unsaturated polyester, phenolic, epoxy resins, urethane and vinyl ester resins. In other preferred aspects of the present invention, wherein is found polymerizable compositions, thermoset resins that can be used include, but are not limited to unsaturated polyester, phenolic, expoxy, urethane and vinyl, ester resins. In other preferred aspects of the present invention, wherein is found polymerizable compositions, thermoplastic resin that can be used, for example, are Nylon 6 (coprolactum) and cyclic PBT (polybutylene terephthalat) Polymerizable compositions preferred in aspects of the present invention can be used in conjunction with or in combination with, one or more of the above mentioned thermoset resins where a casting method to produce automotive components or parts is used, also Nylon 6 (caprolactum) cyclic, PBT can also be made by casting process with flowable mixture. By combining hollow spheres and other materials in preferred compositions of the present invention, engine cooling components or parts that meet the challenge of designing and manufacturing components or parts where dimensional management is very complex, are provided. The preferred aspects of the invention allow for dimensional management during the design and manufacturing of the engine cooling system component or part, as well as providing for superior product performance and manufacturability.

The preferred aspects of the present invention have the advantage that even many materials currently used in injection molding processes for manufacturing (or many, if not most, of the plastic components in engine cooling applications), can be produced with the preferred composition of the present invention.

The composition of the present invention may be manufactured using a variety of processes including, traditional injection molding, compression molding, resin transfer molding, reaction injection molding, resin casting etc. Preferred are parts made by injection molding though injection molding, though other processes than injection molding are also possible using the compositions of the present invention, and, such processes are envisioned to be with the scope of aspects of the present invention.

The composition of preferred aspects of the present invention has been found to possess important characteristics that aid in product manufacturing and functionality, especially of end products or final component or components or parts, and overall engine cooling system performance, while providing for the desired material properties of the individual and collective engine cooling end products, components or parts.

The preferred methods of making compositions of the present invention relate to the fact that in automotive applications, the final part is designed based on the characteristics and that material selection for the composition of the part. Automotive parts are exposed to many physical conditions throughout the development process, and, need to survive these conditions as well as to be produced while respecting certain economical criteria. Material cost, material performance in desired application, and material processing involving mold or die design in conjunction with parameters are key factors that go in to selection of material.

During the process of mold building, molds typically are designed partially based on shrinkage factors of the specific materials selected, and the mold is built (and part measurements are done) after molding the part. Once the areas of the parts determined to be out of dimensional specifications are identified, the correction to the mold is made to adjust the mold, and molding is conducted assure desired dimensions are obtained. Numerous cycles of corrections are therefore, likely, and the level of difficultly to find the solution rapidly is significantly influenced by the glass fiber orientation or the higher aspect ration fillers in the plastic. In preferred aspects of the present invention, the glass fiber orientation or similar products that cause longer development time, cost and need to maintain the dimensions throughout the life of the part are either reduced in volume, or, no longer necessary, due to their replacement with hollow spheroidal elements and, therefore, the mold making process, and, specifically, the time for mold making, is significantly reduced and thus cost is reduced and quality is improved.

The preferred aspects of the present invention improve manufacturing efficiencies of plastic parts requiring tight dimensional control, by elimination the need for multiple mold adjustments, and reducing part weight and part cost. In preferred aspects of the present invention, matrices with fillers such as glass beads, comprise hollow spherical or spheroidal materials, such as hollow glass bubbles, that are used with resin or plastic or resin or plastic like materials, and replace, substitute or otherwise diminish the need for use of such fillers, while provided the above listed advantages.

In preferred embodiments of the present invention, a composition comprising resin or plastic and resin or plastic like material and at least one, and, preferably, a plurality of, spherical or spheroidal materials, and, more preferably hollow glass bubbles are used. In even more preferred aspects of the present invention, in addition to a or a number of hollow glass bubbles found in the plastic or resin or plastic or resin like material, another or other materials, in particular, at least one so called secondary 'filler', is present. In other more preferred embodiments or aspects of the present invention, one or more fillers in combination with other known secondary fillers, is present at a weight ratio hollow glass bubble to other filler of less than or equal to 40 (for example 40% by weight of hollow glass bubble or corresponding volume percentage of 61% for glass bubble). The weight percentage of hollow glass bubble in preferred compositions could be as high as 45% by weight (45% or less) with or without combination of other fillers.

In the preferred embodiments of the present invention, at least one glass bubble is present. Use of a plurality glass bubbles, as in more preferred embodiments of the present invention, causes a reduced weight of material versus that where a composition of the present invention, is not present. The preferred compositions of the present invention with glass bubbles weigh less for the specific volume of material need, at least 2% less versus a solid, partially sold, or filler added composition using fiberglass without glass bubbles, and yields particularly lower weight components, without diminishing strength or dimension stability aspects of the part or component In preferred processes of the present invention, an automotive part or component is designed considering the specific properties of the composition desired. In non-limiting, more preferred embodiments of the present invention, for example, a composition is selected for use in an automotive product which consists of a polymeric material (resin or plastic or resin or plastic like material), one or more same or different fillers, and one or more hollow glass bubbles.

Figures 1A, 1B:
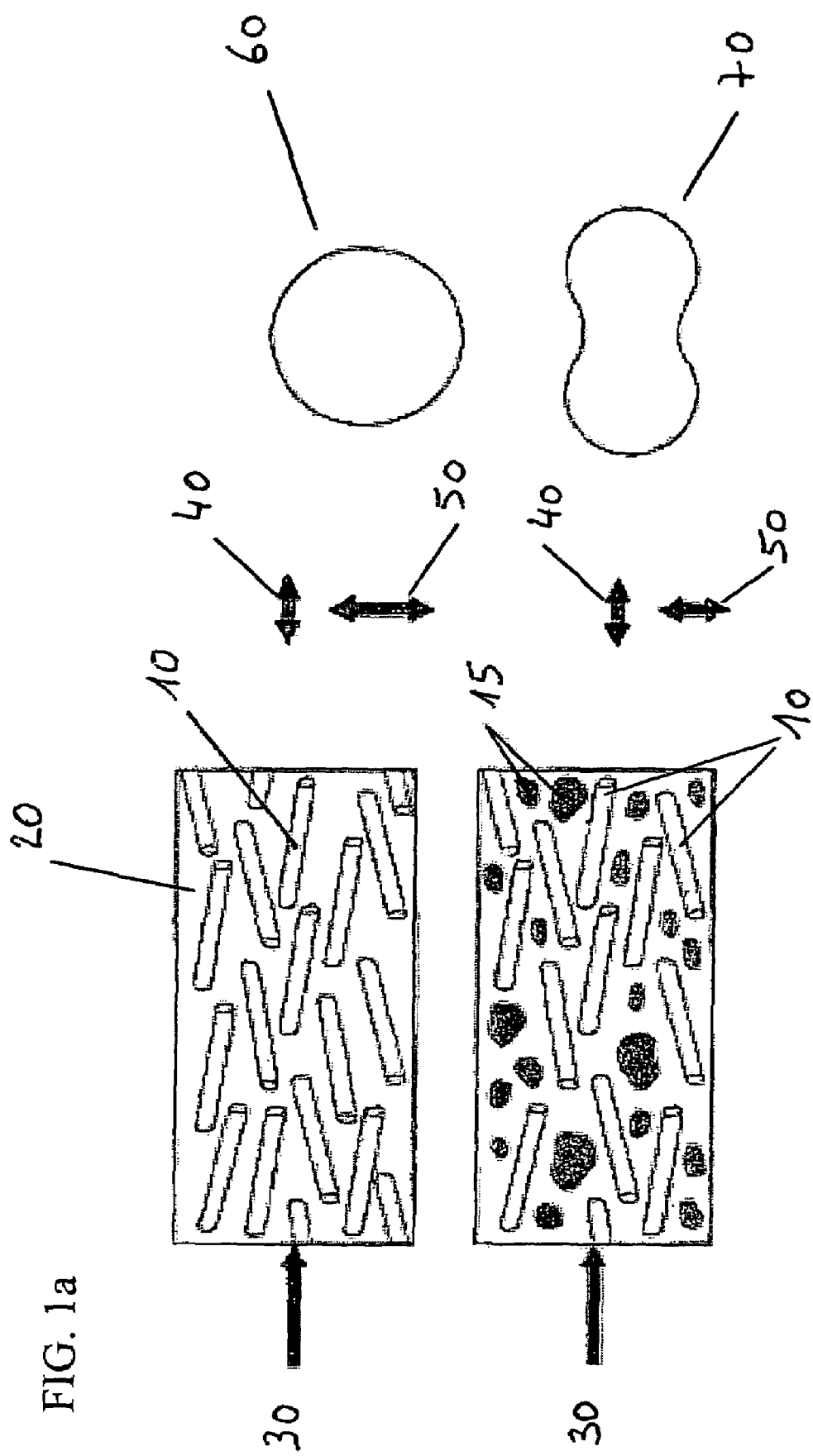
FIG. 1 is a schematic representation of current materials with matrices comprising filler material.

Referring to FIG. 1a is illustrated a portion of a component known in the art having a glass fiber (10) in matrix (20) having been injection molded, in the flow direction (30) or longitudinal direction; shrinkage is lower than the cross flow or transverse direction (50). The secondary fillers, such as glass fibers are more or less circular and with this higher aspect ratio filler the differential shrinkage i.e. difference between in-flow (longitudinal) and cross-flow (transverse) directions is higher and this causes dimensional changes on the manufactured part, which are not desired for fit and functionality.

Also cross section of fibers can be changed to reduce the differential shrinkage, for example circular cross section can be made to be bilobal (70) and can be further mixed with flakes (15) or minerals (not shown).

Figure 2:
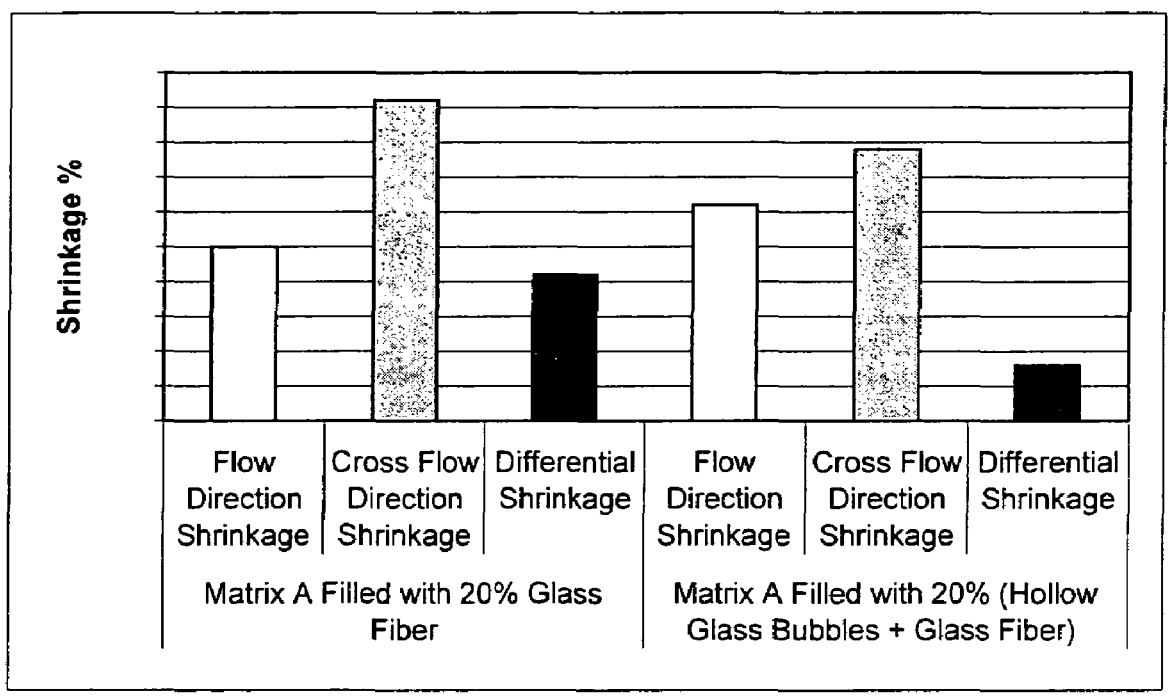
FIG. 2 is a graphic representation showing the tendency or approach to zero of differential shrinkage when using compositions of the present invention.

Referring to FIG. 2a is illustrated the effects of features such as secondary fillers glass bead, glass flake and glass fiber on mold shrinkage for injection molding. Solid glass bead, as shown in the above, have lower % of mold shrinkage or lower differential shrinkage. FIG. 2b shows the similar effect with hollow glass bubbles. In preferred aspects of the present invention, hollow glass add less weight to overall composition versus secondary fillers such as fiber, flake or glass bead (or only glass beads),which take up approximately the same overall volume.

Figure 3A:
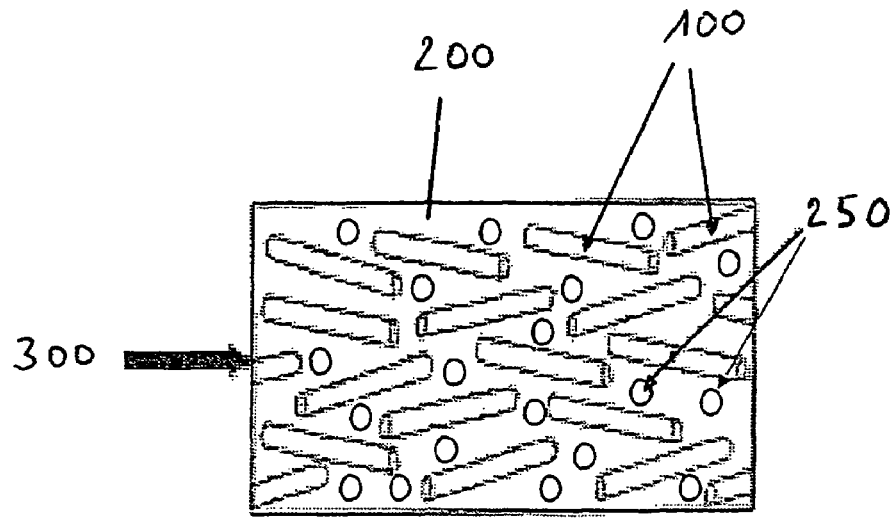
FIG. 3 is a schematic representation of compositions comprising polymeric material with hollow glass bubbles incorporated, in accordance with an aspect of the present invention.
Figure 3B:
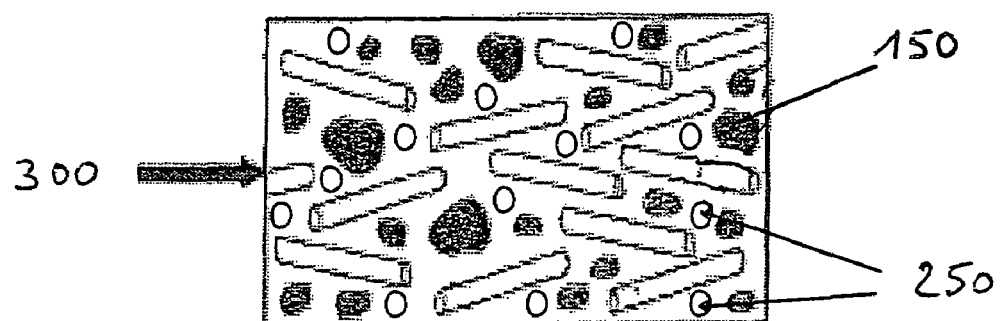
Figure 3C:
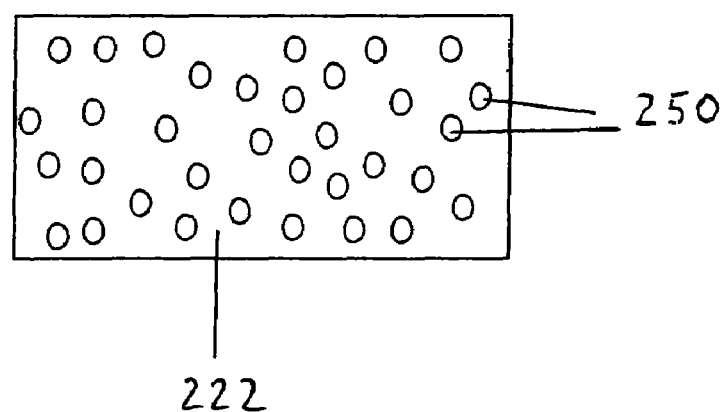

Referring to FIG. 3 is illustrated hollow glass bubbles (250) and glass fiber (100) in polymer matrix (200) with flow direction of molding (300), in accordance with a preferred embodiment of the present invention. FIG. 3b additionally shows mineral filler (150) in the matrix (200). FIG. 3c show hollow glass bubbles (250) in resin or plastic like material matrix (220), not effected by flow direction.

As stated above, the parts or components produced with compositions of the preferred aspects of the present invention lead to improvements in weight reduction and dimensional stability that can be greater than that using traditional fillers alone or in combination with other products. In the more preferred embodiments of the present invention, by using the spheroidal or sphere shaped materials, and especially, hollow materials and glass spheroidal or sphere shaped bubbles, lower aspect ratio are achieved. In measuring the aspect ratios, as will be understood by the man of ordinary skill in the art, fillers have various ratios. However, it has been found that preferred are materials that allow the aspect ratio to dimish, i.e. though functional is found from ±500, preferred are those where length to diameter or length to width ratio measures tend towards or approach 1. For reference generic short glass fiber has length to diameter ratio of 20. The spherical glass beads have aspect ratios of almost 1. Based on this understanding when the mixture is prepared with smaller aspect ratio 'fillers' i.e. closer to 1, the differential shrinkage diminished or is lowered, tends or approaches zero, and hence dimensional stability is improved compared to the compounds carrying higher amounts of larger aspect ratio fillers.

Figure 4:
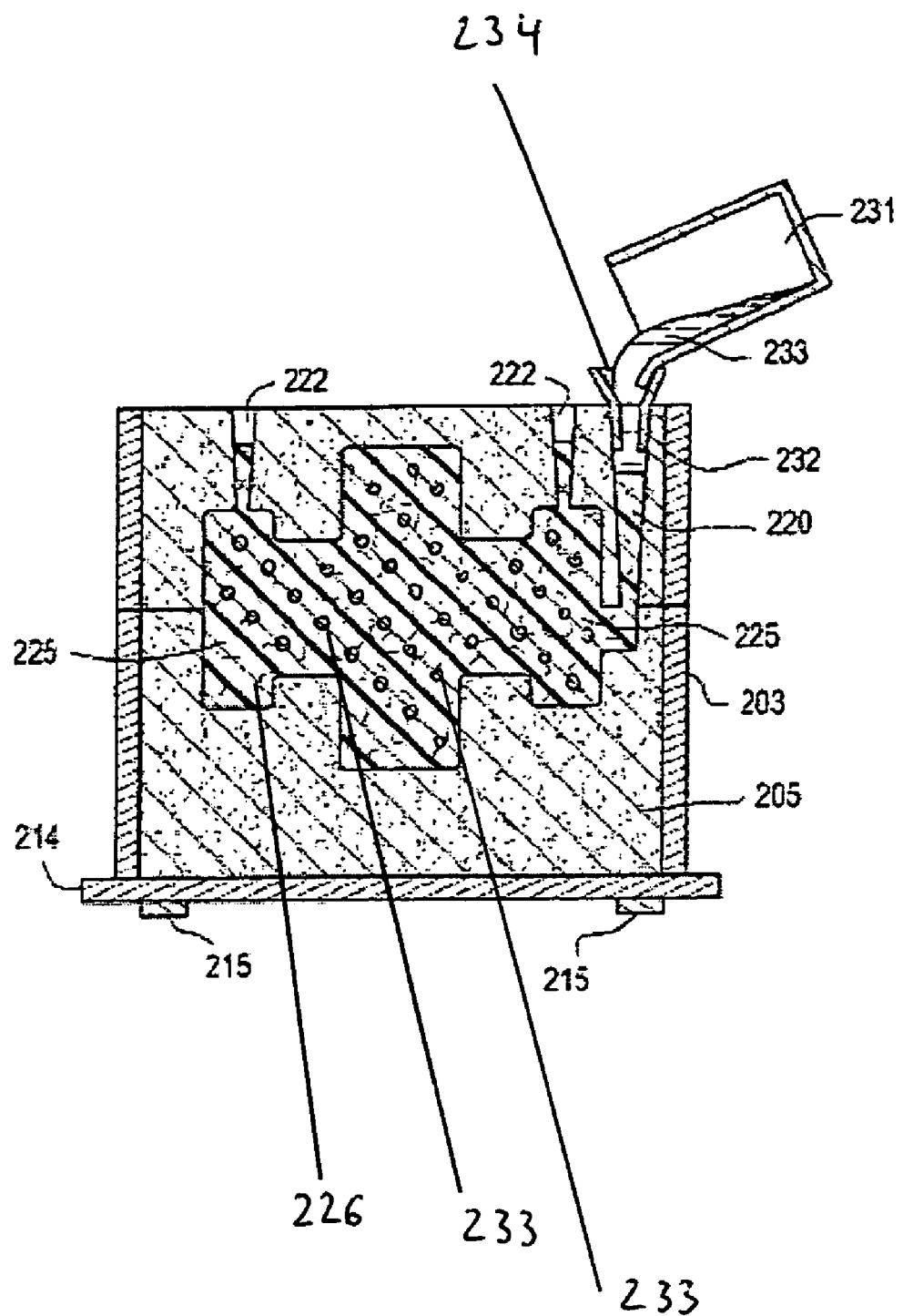
FIG. 4 is a schematic representation of a method or process of casting process using composition comprising hollow glass bubbles, in accordance with an aspect of the present invention.

Referring to FIG. 4 is illustrated a method of producing parts using a flowable polymerizable form of composition in accordance with an aspect of the present invention. Flowable polymerizable composition (231) having at least hollow glass bubble (233) is fed into mold at point (234) into runner system or feeding system (233)(220) to go into mold or die (205). Die (205) which is a mold or has venting points (222). Parts (225) has hollow glass bubbles (233) in the polymerizable matrix (226). Also shown is glass fiber (227).

In preferred embodiments of the present invention, polymerizable mixtures or polymerizable polymeric mixtures are used in casting, the components or parts formed where hollow glass bubbles have been added to polymerizable mixtures which are flowable, the improved suspension capability of hollow glass bubble and inherent advantages mentioned above will provide lower cost, time and dimensionally stable components or parts for automotive applications.

In further aspects of the present invention, a process or method to produce molds is described. In preferred aspects of the present invention, a composition formed of resin or plastic or resin or plastic like material, is formed.

In preferred embodiments of the present invention, a process is provided whereby parts for automotive engine cooling or automotive HVAC use, for example, will be manufactured with known shrinkage properties on the mold which incorporates shrinkage properties of the material. Once the parts are made only small amount of dimensional corrections will be made if necessary to make it in to production and in final usable state.

As described above the end product of interest where the product contains combinations of fillers especially containing hollow glass bubbles can be obtained through many processes. The key processes are as follows: for thermoplastic based materials the base plastic material is mixed with hollow glass bubbles and other combinations of fillers and additives and mixed using a compounding process for example extruder which provided pellets of materials which can be further shaped to in desired product.

In preferred aspects of the present invention wherein automotive end parts or components are formed from a composition using thermoset based materials, the base matrix material or materials, such as polymeric material and the like, is mixed with hollow glass bubbles and other combinations of fillers, additive and catalyst package in a mixing process which finally supplies material to a final shaping die or dies or mold or molds.

Vehicle thermal systems, such vehicle engine cooling or HVAC or any other component made with the process where flowable polymerizable composition, are made in preferred embodiments of the present invention, by a method comprising the steps of: providing a means of shaping the part for a mold and, preferably, a casting mold; selecting a flowable polymerizable composition; combining the flowable composition with a plurality of hollow glass bubbles into a flowable mixture; de-aerating the mixture for a time sufficient to lower viscosity of said composition so as to simultaneously retain pourability of the mixture and sufficiently cure and suspend the hollow glass bubbles in the composition; pouring said mixture into the mold; curing said composition so as to form a composite structural plastic component thereby; and removing the component from the mold.

During manufacturing, compositions comprising glass bubbles may further comprise filling materials selected from the group consisting of: fibers, glass fibers, minerals, talc, nano particles, graphite, carbon, Kevlar and ceramic materials. In general, the composition comprised of resin or plastic, or resin or plastic like materials, may comprise various different filling materials suitable for specific end application needs while providing improved dimensional stability and adequate strength. One or more fillers may be added to the composition at various steps in the formation and/or in one or more feeding point(s) of the process, leading to a combination of other one or more fillers with at least one hollow glass bubble or bubbles.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A composite engine compartment member, comprising:
   a) a resin material or a plastic material forming a matrix; and
   b) at least one hollow spherical or sphere shaped material in the matrix;
   wherein the composite engine compartment member has sufficient strength and dimensional stability to be exposed to thermally varying environmental conditions and is configured to exhibit a differential shrinkage that tends to or approaches zero;
   and wherein the engine compartment member is one of a radiator end tank, a charge air cooler air tank, a radiator cooling fan, or a radiator shroud.

2. The composite engine compartment member as in claim 1, wherein the aspect ratio of each unit of the at least one hollow spherical or sphere shaped material tends to or approaches 1.

3. The composite engine compartment member as in claim 1, wherein each unit of the at least one hollow spherical or sphere shaped material is a hollow glass bubble.

4. The composite engine compartment member as in claim 2, wherein the hollow spherical or sphere shaped material is a hollow glass bubble.

5. The composite engine compartment member as in claim 3, wherein the aspect ratio of the hollow glass bubble is between about 1 and 500.

6. The composite engine compartment member as in claim 5, wherein the aspect ratio of the hollow glass bubble tends to or approaches 1, and there is a plurality of hollow glass bubbles.

7. The composite engine compartment member as in claim 6, further comprising a secondary filler.

8. The composite engine compartment member as in claim 7, wherein the secondary filler is selected from the group consisting of fiber, glass fiber, mineral, talc, glass, graphite, carbon, ceramic, KEVLAR, and nano particles.

9. The composite engine compartment member as in claim 1, wherein the end product is a thermal vehicle systems or engine cooling system application end product.

10. The composite engine compartment member as in claim 6, wherein the end product is a thermal vehicle systems or engine cooling system application end product.

11. The composite engine compartment member as in claim 9, wherein the composite engine compartment member is used in combination with other materials in a two shot or multiple material manufacturing process to produce a resulting member.

12. The composite engine compartment member as in claim 7, wherein the composite engine compartment member includes a polymerizable material.

13. A composite engine compartment member made by a method utilizing a composition having at least one glass bubble and a polymeric matrix, wherein the process comprises the steps of:
   a) providing a means of shaping a part for a mold;
   b) selecting a flowable polymerizable composition;
   c) combining the flowable composition with a plurality of hollow glass bubbles into a flowable mixture;
   d) de-aerating the mixture for a time sufficient to lower viscosity of the composition so as to simultaneously retain pourability of said mixture and sufficiently cure and suspend the plurality of hollow glass bubbles in the composition;
   e) pouring the mixture into the mold;
   f) curing the composition so as to form the composite engine compartment member thereby; and
   g) removing the composite engine compartment member from the mold.

14. A method of making a composite engine compartment member, comprising the steps of:
   a) providing a means of shaping the composite engine compartment member for a mold;
   b) selecting a flowable polymerizable composition;
   c) combining the flowable composition with a plurality of hollow glass bubbles into a flowable mixture;
   d) de-aerating the mixture for a time sufficient to lower viscosity of the composition so as to simultaneously retain pourability of said mixture and sufficiently cure and suspend the plurality of hollow glass bubbles in the composition;
   e) pouring the mixture into the mold;
   f) curing the composition so as to form the composite engine compartment member thereby;
   g) removing the composite engine compartment member from the mold; and
   h) combining the composite engine compartment member with an other part of a motor vehicle body to form an end product made up of the composite engine compartment member and the other part of the motor vehicle body.

* * * * *